United States Patent
Yang et al.

(10) Patent No.: US 12,006,650 B2
(45) Date of Patent: Jun. 11, 2024

(54) PILE POURING STRUCTURE BASED ON INFORMATIZATION TECHNOLOGY AND PILE STRUCTURE

(71) Applicant: CHINA MCC5 GROUP CORP.LTD, Sichuan (CN)

(72) Inventors: Genming Yang, Sichuan (CN); Liming Deng, Sichuan (CN); Xingguo Liao, Sichuan (CN)

(73) Assignee: CHINA MCC5 GROUP CORP. LTD, Sichuan (CN)

( * ) Notice: Subject to any disclaimer, the term of this patent is extended or adjusted under 35 U.S.C. 154(b) by 242 days.

(21) Appl. No.: 17/594,797

(22) PCT Filed: Mar. 18, 2021

(86) PCT No.: PCT/CN2021/081543
§ 371 (c)(1),
(2) Date: Oct. 29, 2021

(87) PCT Pub. No.: WO2022/052437
PCT Pub. Date: Mar. 17, 2022

(65) Prior Publication Data
US 2022/0307217 A1    Sep. 29, 2022

(30) Foreign Application Priority Data
Sep. 9, 2020  (CN) .......................... 202021952083.1

(51) Int. Cl.
E02D 5/34        (2006.01)
(52) U.S. Cl.
CPC ........ *E02D 5/34* (2013.01); *E02D 2250/0023* (2013.01)
(58) Field of Classification Search
CPC .................................................... E02D 5/34
See application file for complete search history.

(56) References Cited

U.S. PATENT DOCUMENTS

| 6,301,551 B1 * | 10/2001 | Piscalko ................. E02D 13/06 |
| | | 702/188 |
| 9,340,947 B2 * | 5/2016 | Henderson ............ E02D 27/425 |
| 10,451,519 B2 * | 10/2019 | Likins, Jr. ............... E02D 13/06 |

FOREIGN PATENT DOCUMENTS

| CN | 104636873 A | 5/2015 |
| CN | 109636906 A | 4/2019 |

(Continued)

OTHER PUBLICATIONS

Machine translation of CN110306537 accessed Aug. 23, 2023 (Year: 2023).*

*Primary Examiner* — Janine M Kreck
(74) *Attorney, Agent, or Firm* — NKL Law; Allen Xue

(57) ABSTRACT

A pile pouring structure includes a steel reinforcement cage, a limiting ring arranged on the outer side of the steel reinforcement cage, a plurality of PVC pipes arranged in the steel reinforcement cage, a cut-off layer arranged on the limiting ring, a two-dimensional code display board arranged in one-to-one correspondence with the steel reinforcement cage, the cut-off layer is annular. The two-dimensional code display board is provided with a two-dimensional code which is scanned to enter an information input interface. Information management is achieved in the pile construction process by scanning the two-dimensional code for inputting pile body strength information, thereby improving the work efficiency. The cut-off layer is used as an interface between a pile body and a pile head so that a part needing to be broken is rapidly positioned. The pile head at a part above the cut-off layer is broken so that the cut-off layer is capable of protecting a lower structure.

4 Claims, 1 Drawing Sheet

(56) References Cited

FOREIGN PATENT DOCUMENTS

| | | | |
|---|---|---|---|
| CN | 110306537 A | | 10/2019 |
| CN | 110835911 A | * | 2/2020 |
| CN | 111287185 A | | 6/2020 |
| CN | 111980014 A | | 11/2020 |
| CN | 212405118 U | | 1/2021 |
| JP | 2004132022 A | | 4/2004 |
| WO | 2017141039 A1 | | 8/2017 |

* cited by examiner

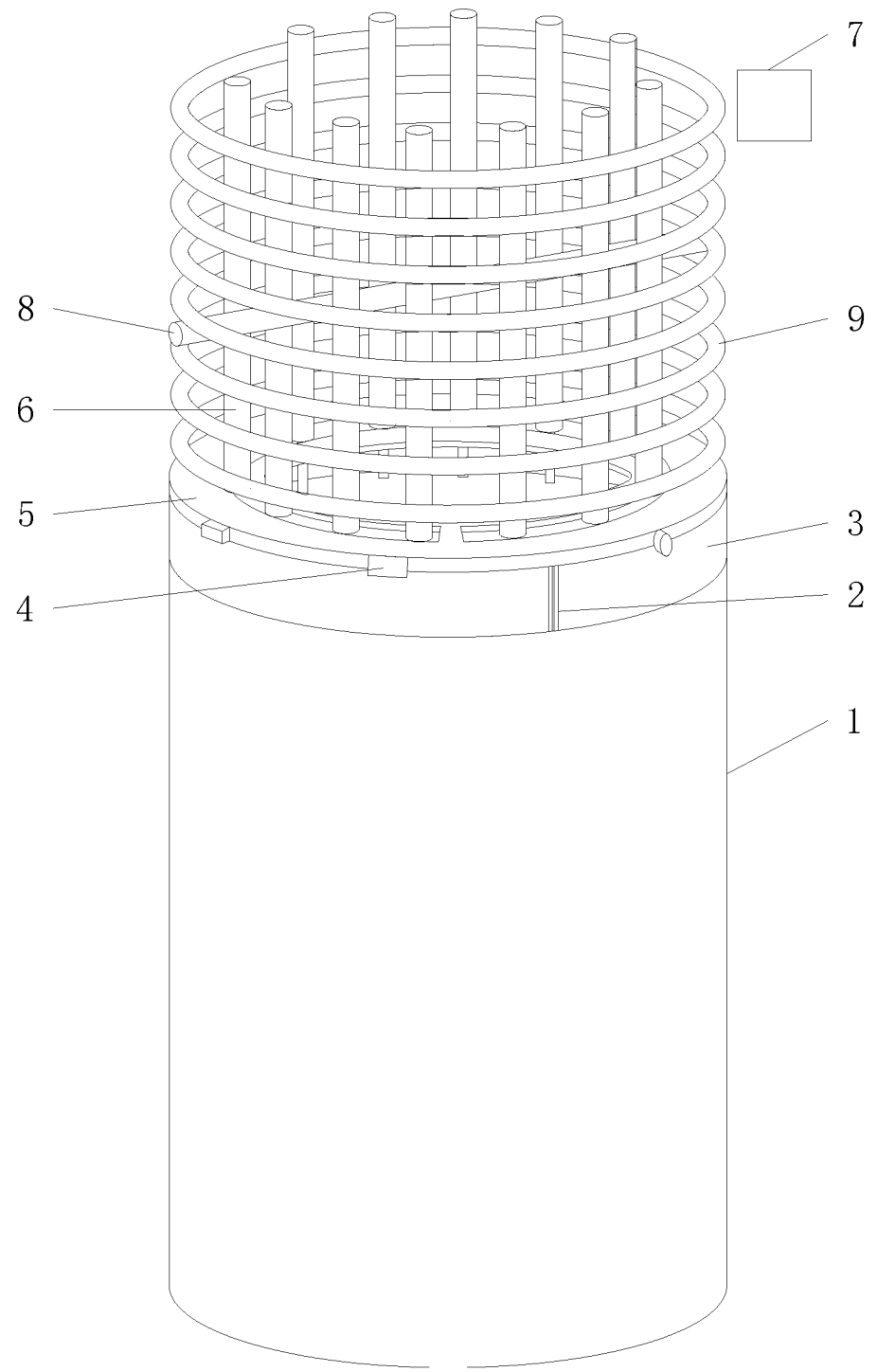

PILE POURING STRUCTURE BASED ON INFORMATIZATION TECHNOLOGY AND PILE STRUCTURE

CROSS-REFERENCE TO RELATED APPLICATIONS

The present application is a U.S. national entry of PCT international application NO. PCT/CN2021/081543, filed Mar. 18, 2021, which claims priority to Chinese Patent Application No. 202021952083.1 filed to China National Intellectual Property Administration on Sep. 9, 2020, and entitled "PILE POURING STRUCTURE BASED ON INFORMATIZATION TECHNOLOGY AND PILE STRUCTURE", which are incorporated herein by reference in their entirety.

TECHNICAL FIELD

The present invention relates to the construction technical field, in particular to a pile pouring structure based on the informatization technology and a pile structure.

BACKGROUND

Since cast-in-place piles are frequently used in various projects, the construction delay is normally caused by changes in pile diameter, statistical difficulties of construction information, low efficiency of pile head breaking, etc. Therefore, the timely and efficient pile breaking is the key to ensure the construction schedule, and it is also emphasized in studies to avoid the influence to pile body quality, improve the pile breaking method and reduce the labor input.

The cast-in-place pile head is conventionally broken by means of a manual-type pneumatic pick. The excavation of soil between piles is started when the concrete strength reaches 70%. The worker breaks the pile by means of the pneumatic pick according to the anchorage length, and then restores the reinforcement straightness after breaking.

The method shows the following disadvantages: 1. low-speed breaking and heavy dust affect the worker's health and environment; 2. uncontrollable pile body strength for breaking, i.e., excessive strength decreasing the breaking efficiency and insufficient strength affecting the pile body integrity; 3. breaking length greatly dependent on the worker's ability, thus increasing the project cost; and 4. great influence by long-time breaking on the pile body quality.

SUMMARY

To overcome the deficiencies of the prior art, an object of the present invention is to provide a pile pouring structure based on the informatization technology and a pile structure, thus facilitating management of information, such as strength and construction records of cast-in-place piles, and improving the efficiency of breaking pile head.

The present invention is carried out by the following technical solution: a pile pouring structure based on informatization technology, comprising a steel reinforcement cage, a limiting ring arranged on the outer side of the steel reinforcement cage, a plurality of PVC pipes arranged in the steel reinforcement cage, a cut-off layer arranged on the limiting ring, a two-dimensional code display board arranged in one-to-one correspondence with the steel reinforcement cage, the cut-off layer is annular, and the two-dimensional code display board is provided with a two-dimensional code which is scanned to enter an information input interface.

Further, in order to better realize the object of the present invention, the cut-off layer is provided with elongated openings that the plurality of PVC pipes pass through.

Further, in order to better realize the object of the present invention, the cut-off layer and the limiting ring are connected by means of a fastener.

Further, in order to better realize the object of the present invention, the limiting ring is a steel ring.

Further, in order to better realize the object of the present invention, the cut-off layer is a PVC board.

Further, in order to better realize the object of the present invention, the steel reinforcement cage is provided with an embedded steel pipe.

Further, in order to better realize the object of the present invention, the embedded steel pipe is sealed by means of sealing plugs.

A pile structure based on informatization technology, comprising a cast-in-place pile formed by means of the pile pouring structure.

The beneficial effects of the present invention are as follows:

according to the solution, informatization management is achieved in the pile construction process by scanning the two-dimensional code for inputting pile body strength information, thereby improving the work efficiency; the cut-off layer is used as an interface between a pile body and a pile head so that a part needing to be broken is rapidly positioned; and the pile head at a part above the cut-off layer is broken, so that the cut-off layer is capable of protecting a lower structure, and damage to a part below the cut-off layer is reduced in the breaking process.

BRIEF DESCRIPTION OF THE DRAWINGS

The FIGURE is a structural diagram of a pile pouring structure;

symbols in the FIGURE: 1—cast-in-place pile, 2—steel ring fastener, 3—limiting ring, 4—fastener, 5—cut-off layer, 6—PVC pipe, 7—two-dimensional code display board, 8—embedded steel pipe, 9—steel enforcement cage.

DESCRIPTION OF THE PREFERRED EMBODIMENTS

The present invention will be further described in detail in combination with examples, but the present invention is not limited to the following embodiments.

Embodiment 1

As shown in the FIGURE, the present embodiment discloses a pile pouring structure based on informatization technology, comprising a steel reinforcement cage 9, a limiting ring 3 arranged on the outer side of the steel reinforcement cage 9, a plurality of PVC pipes 6 arranged in the steel reinforcement cage 9, a cut-off layer 5 arranged on the limiting ring 3, a two-dimensional code display board 7 arranged in one-to-one correspondence with the steel reinforcement cage 9, the cut-off layer 5 is annular, and the two-dimensional code display board 7 is provided with a two-dimensional code which is scanned to enter an information input interface.

During construction, the BIM is accomplished according to design requirements, thus a pile hole is excavated and the steel reinforcement cage sized properly is fabricated accordingly. The limiting ring 3 is arranged at corresponding position of the steel reinforcement cage 9, and the cut-off layer 5 is arranged on the limiting ring 3. A part above the cut-off layer 5 is designed as a pile head and a part below the limiting ring 3 is designed as a pile body. A two-dimensional code in one-to-one correspondence with the pile pouring structure is arranged, and relevant information, such as construction process and construction schedule of the pile structure, is input by scanning the two-dimensional code, thus facilitating the management of construction information.

After fabrication of the pile pouring structure, the pile pouring structure is placed in the pile hole and concreted. As the limiting ring 3 and the cut-off layer 5 are annular, the cut-off layer 5 avoids impeding the concrete flow and further affecting the normal pouring process of a cast-in-place pile 1.

After pouring the cast-in-place pile 1, the strength of the cast-in-place pile 1 is measured, and soil between piles is excavated when the strength reaches 70% to expose the overall pile head. The cut-off layer 5 and the limiting ring 3 form a relatively obvious interface, thus facilitating rapid positioning to improve the construction efficiency. In the present embodiment, the pile body strength is measured by a full-automatic digital ultrasonic-rebound tester, and the data measured with the full-automatic digital ultrasonic-rebound tester are input by scanning the two-dimensional code to facilitate storage and processing of these data. The information input by scanning the two-dimensional code is synchronized to the BIM platform for processing thereby.

After the cut-off layer 5 is positioned, a hole is drilled in the pile body above the cut-off layer 5 in a radial direction, and a splitting wedge is driven into the hole to loosen the pile head. During the drilling, the cut-off layer 5 protects the lower pile body, reduces the influence of drilling on the lower structure, and prevents the structure adjacent to the drilling position from looseness and damage in compression during drilling, thus reducing the difficulty of later restoration.

The loose pile head is hoisted and transferred to complete the breaking work, and the remained reinforcement is restored. The completion information of the pile head breaking is input by scanning the two-dimensional code.

Embodiment 2

On the basis of the above-mentioned embodiment, the present embodiment discloses the cut-off layer 5 provided with elongated openings that the plurality of PVC pipes 6 pass through. The elongated openings enable the PVC pipes 6, the reinforcements and other structures to pass through, thereby avoiding interference between the cut-off layer 5 and the steel reinforcement cage 9.

The limiting ring 3 is used to support the cut-off layer 5, thereby enhancing the stability of the cut-off layer 5 and preventing the cut-off layer 5 from displacement or deflection caused by the impact of concrete.

In the present embodiment, the cut-off layer 5 and the limiting ring 3 are connected by means of a fastener 4, thereby improving the strength of connection between the cut-off layer 5 and the limiting ring 3.

In the present embodiment, the limiting ring 3 is a steel ring, thereby ensuring the strength and stability of the limiting ring 3, and the limiting ring 3 is retained in the cast-in-place pile 1 as a part of the pile structure to enhance the strength and bearing capacity at the top of the cast-in-place pile 1, and protect the top when the cast-in-place pile 1 bears other structures in the later stage.

The steel ring may be formed by bending a flexible steel band into a circle, and two ends of the flexible steel band are connected by means of the steel ring fastener 2. The flexible steel band with different lengths may be selected according to the diameter of the cast-in-place pile 1 and bent into the steel ring to ensure that the size of the limiting ring 3 is adapted to the size of the cast-in-place pile 1.

The cut-off layer 5 is connected with the limiting ring 3 by means of a plurality of cut-off layer fasteners 4.

In the present embodiment, the cut-off layer 5 is a PVC board.

Embodiment 3

On the basis of the above-mentioned embodiments, the present embodiment discloses the steel reinforcement cage 9 provided with an embedded steel pipe 8. In the present embodiment, the embedded steel pipe 8 is positioned above the cut-off layer 5. After concrete pouring, the embedded steel pipe 8 is embedded in the pile head. When the pile head is loosened and needs to be hoisted, the embedded steel pipe 8 may be used as the installation foundation to hoist the pile head, thus facilitating the transfer of the pile head. In the present embodiment, the embedded steel pipe 8 is arranged above the center of gravity of the pile head to avoid unnecessary deflection and swing of the pile head during hoisting.

In the present embodiment, the embedded steel pipe 8 is sealed by means of sealing plugs. Two ends of the embedded steel pipe 8 are sealed by means of the sealing plugs, which prevent concrete from entering into the embedded steel pipe 8 during the concrete pouring, thus avoiding the effect on later use of the embedded steel pipe 8.

The other steps in the present embodiment are identical to those in the above-mentioned embodiments and will not be repeated herein.

The above-mentioned embodiments are only preferred embodiments of the present invention and are not restricted thereto in any way. Any simple modification and equivalent alterations made to these embodiments based on the technical essence of the present invention fall within the protection scope of the present disclosure.

The invention claimed is:

1. A pile pouring structure based on informatization technology, comprising a steel reinforcement cage (9), a limiting ring (3) arranged on an outer side of the steel reinforcement cage, a plurality of PVC pipes (6) arranged in the steel reinforcement cage, a cut-off layer (5) arranged on the limiting ring (3), a two-dimensional code display board (7) corresponding to the steel reinforcement cage (9), a steel pipe (8) disposed across the steel reinforcement cage (8) at a location above the cut-off layer (5) in a traverse direction relative to a direction of the plurality of PVC pipes (6), wherein the cut-off layer (5) is annular in shape and is made of PVC, the plurality of PVC pipes (6) extends through the cut-off layer (5), and the two-dimensional code display board displays a two-dimensional code that provides an information input interface when scanned.

2. The pile pouring structure based on informatization technology according to claim 1, wherein the cut-off layer (5) and the limiting ring (3) are connected using a fastener (4).

3. The pile pouring structure based on informatization technology according to claim 2, wherein the limiting ring (3) is a steel ring.

4. The pile pouring structure based on informatization technology according to claim 1, wherein the steel pipe (8) is sealed using two sealing plugs.

* * * * *